F. LOJACONO.
SUGAR CANE PLANTER.
APPLICATION FILED MAY 19, 1911.
1,003,928.
Patented Sept. 19, 1911.
3 SHEETS—SHEET 1.
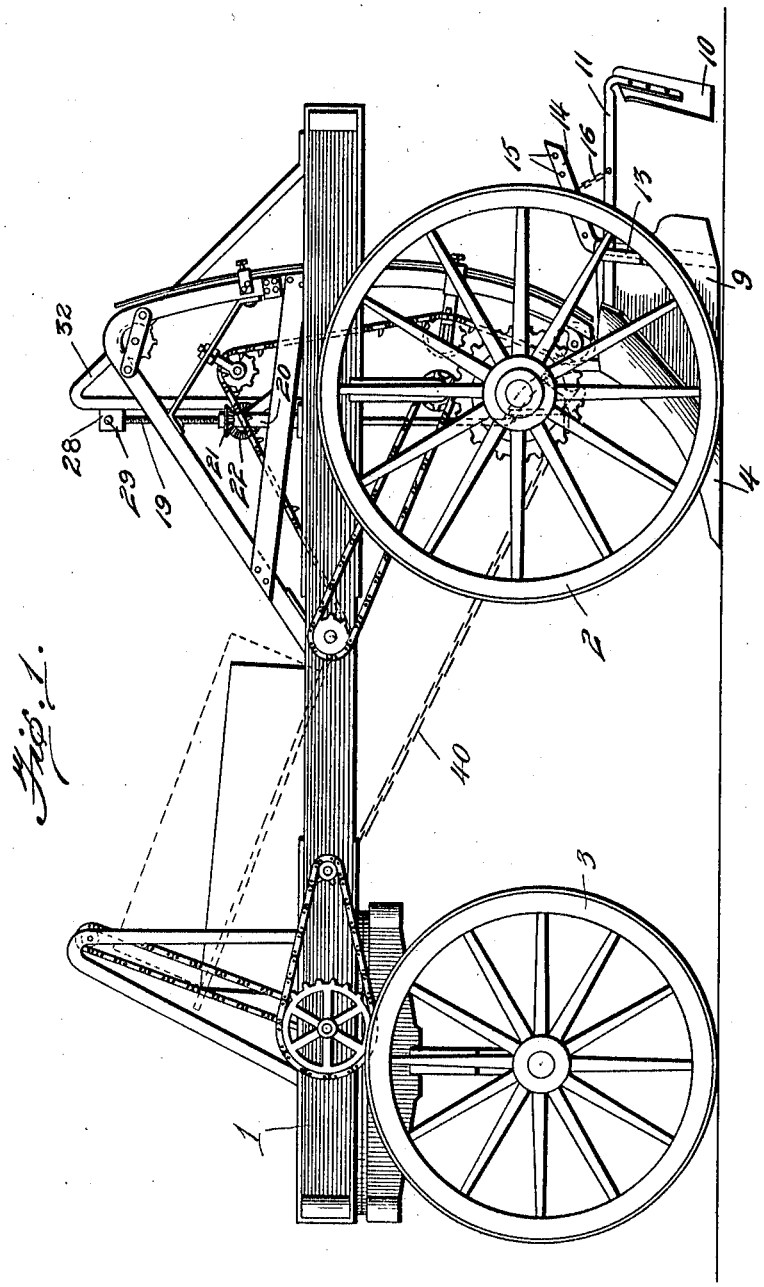

F. LOJACONO.
SUGAR CANE PLANTER.
APPLICATION FILED MAY 19, 1911.
1,003,928.
Patented Sept. 19, 1911.
3 SHEETS—SHEET 2.
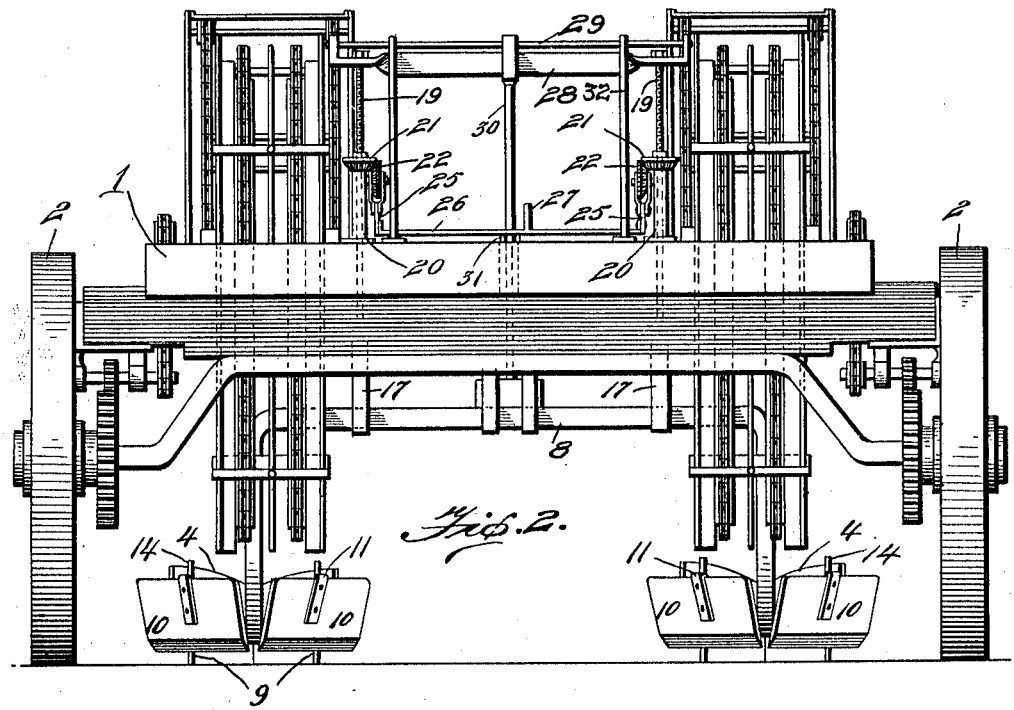
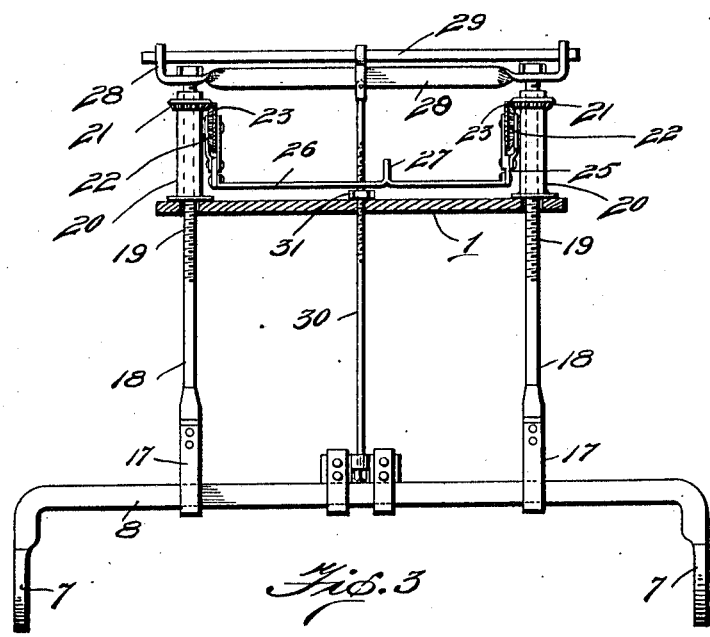
Witnesses
Inventor
Francisco Lojacono
by G. Ayres
Attorney

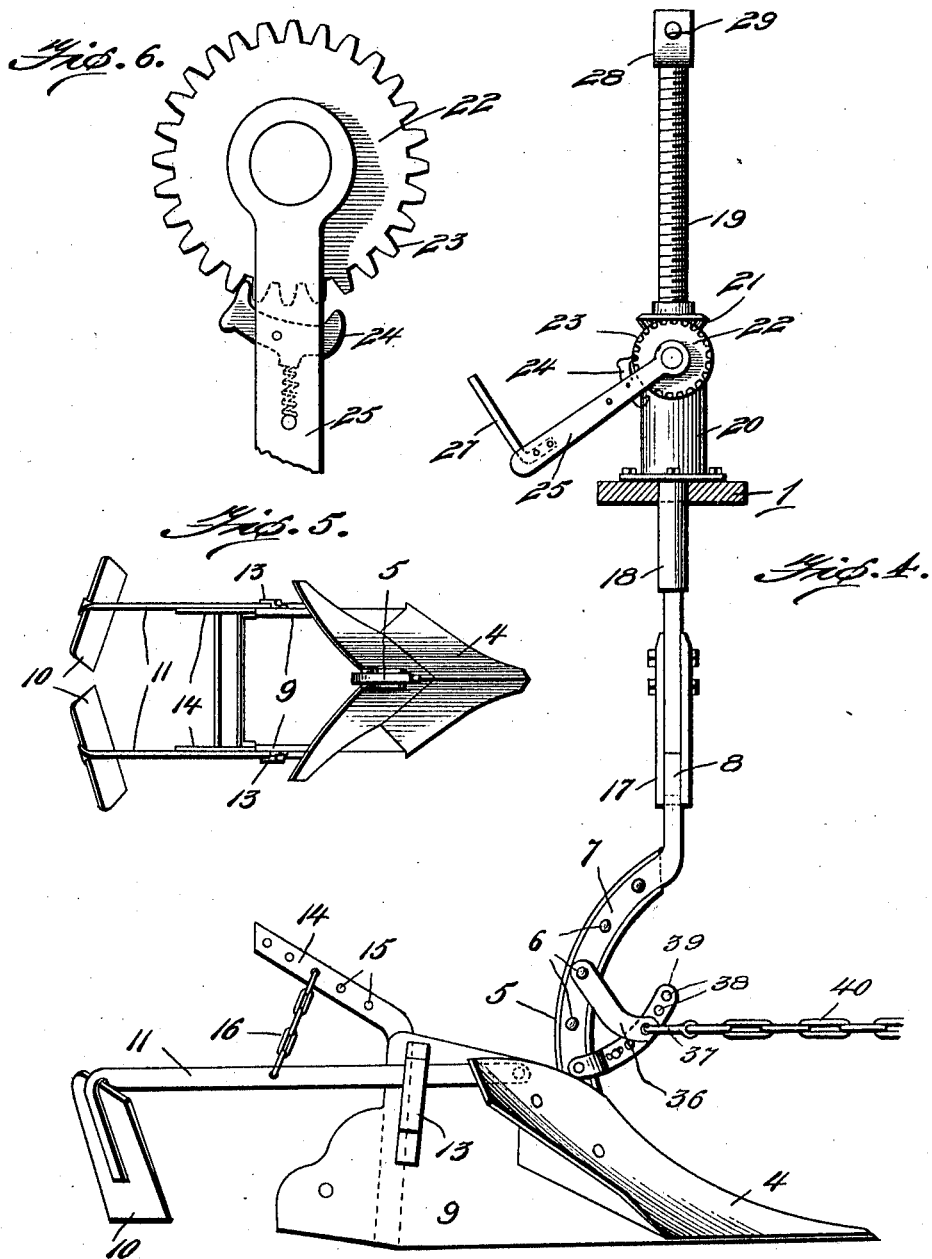

UNITED STATES PATENT OFFICE.

FRANCISCO LOJACONO, OF SAN JUAN, PORTO RICO.

SUGAR-CANE PLANTER.

1,003,928. Specification of Letters Patent. Patented Sept. 19, 1911.

Application filed May 19, 1911. Serial No. 628,342.

*To all whom it may concern:*

Be it known that I, FRANCISCO LOJACONO, a subject of the King of Italy, residing at San Juan, Porto Rico, have invented certain new and useful Improvements in Sugar-Cane Planters, of which the following is a specification.

My invention relates to cane sugar planters, and it consists in the constructions, combinations and arrangements herein described and claimed.

An object of my invention is to provide an improved cane planter constructed to be operated efficiently by a single operator for simultaneously planting two or more rows of cane sections.

A further object of my invention is to provide an improved cane planter having a plurality of furrowing plows adjustably mounted for efficient operation under all practical conditions, and adapted to operate with a greater capacity than has been possible in previous constructions.

In the accompanying drawings, forming a part of this application and in which similar reference numerals indicate corresponding parts in the several views: Figure 1 is a side elevation, illustrating one embodiment of my invention; Fig. 2 is a rear elevation of the construction shown in Fig. 1; Fig. 3 is a rear elevation of the adjustable supporting means for a plurality of furrowing plows; Fig. 4 is an enlarged side elevation of the construction shown in Fig. 3; Fig. 5 is a plan view of one of the plows and its attached covering devices, and Fig. 6 is an enlarged detail view of the ratchet actuating means shown in Fig. 4.

Referring to the drawings, 1 indicates the frame of a planter provided with the usual ground wheels 2 and 3. A pair of furrowing plows 4 are provided with channeled arc-shaped arms 5 for securing them by bolts 6 to corresponding depending portions 7 on the ends of a cross bar 8. The plows are provided with rearwardly-extending mold boards 9, to which are pivotally connected swing arms 11 carrying covering devices 10. The boards 9 are provided with guides 13 for the swing arms, and with inclined lugs 14 provided with series of holes 15 for receiving hooks on the ends of chains 16 secured to said arms 11; thereby providing convenient means for adjusting the covering devices relative to the plows. The cross bar 8 is secured by straps 17 to a pair of adjustable supporting rods 18 provided with threaded upper portions 19 which extend freely through standards 20 rigidly bolted to the frame 1. Beveled wheels 21 are rotatably mounted on the standards 20 in threaded engagement with the portions 19 of the screw rods 18. Beveled drive wheels 22 are journaled on the standards 20 in mesh with said wheels 21, and are provided with spur teeth 23 adapted to be actuatingly engaged by spring pawls 24 pivoted on arms 25. The arms 25 are shown rigidly connected by a rod 26 having a handle 27; thereby providing a common means for raising or lowering the supporting rods 18 for simultaneously shifting the several plows 4.

The upper ends of the supporting rods 18 are connected by a plate 28 slidably engaging a bracket 32, and carrying a bar 29, from which a stop rod 30 depends for attachment to the central portion of the cross bar 8. A stop nut 31 is adjustably threaded on the rod 30 for engaging the frame 1 to limit the downward movement of the cross bar 8 and its attached plows.

The construction of the conveyers and planter boxes is fully described and claimed in my copending application Serial No. 591441, and not to be further described.

A draft head 36 is pivotally connected to the arm 5 of each plow 4 for adjustable connection by a hook 37 with any of a series of holes 38 in pivoted links 39 on said arms 5. The hooks 37 are carried by chains 40 adapted to be connected to any convenient portion of the frame 1 for strongly bracing the furrowing plows in all of their adjusted positions.

My invention provides an improved construction adapted to plant a plurality of rows of cane sections with the services of only a single operator; thereby effecting a great saving in the time and cost of operation in previous constructions requiring two operators for planting a single row of cane sections.

I have illustrated preferred and satisfactory constructions, but changes could be made within the spirit and scope of my invention.

I claim—

1. In a cane planter, the combination of a frame, a cross bar, a plurality of furrowing plows secured to said bar, adjustable supporting rods for said bar, a common means for adjusting said rods for simultaneously elevating and depressing said several plows, a connection between said supporting rods, and an adjustable stop carried by said connection for limiting the downward movement of said plows, substantially as described.

2. In a cane planter, the combination of a frame, standards on said frame, members rotatably mounted on said standards, screw rods threaded through said members, a plurality of furrowing plows supported by said rods, a common means for rotating said members, and an adjustable stop for limiting the downward movement of said screw rods, substantially as described.

3. In a cane planter, the combination of a frame, standards on said frame, bevel gears rotatably mounted on said standards, screw rods threaded through said gears, a cross bar supported by said rods, a plurality of furrowing plows secured to said bar, drive bevel gears meshing with said first gears, and a common means for actuating said drive gears, substantially as described.

4. In a cane planter, the combination of a frame, standards on said frame, bevel gears rotatably mounted on said standards, screw rods threaded through said gears, a cross bar supported by said rods, a plurality of furrowing plows secured to said bar, drive bevel wheels meshing with said gears, independent ratchet mechanisms for operating said several bevel gears, and a common means for actuating said ratchet mechanisms, substantially as described.

5. In a cane planter, the combination of a frame, a cross bar, adjustable rods supporting said bar, means for simultaneously adjusting said supporting rods for shifting the position of said cross bar, furrowing plows secured to said cross bar, a connection between the upper ends of said supporting rods, and brackets on said frame extending into guiding engagement with said connection, substantially as described.

In testimony whereof I affix my signature in presence of two witnesses.

FRANCISCO LOJACONO.

Witnesses:
C. A. BAKER,
G. AYRES.

---

Copies of this patent may be obtained for five cents each, by addressing the "Commissioner of Patents, Washington, D. C."